United States Patent
Sung

[11] Patent Number: 6,159,286
[45] Date of Patent: *Dec. 12, 2000

[54] PROCESS FOR CONTROLLING DIAMOND NUCLEATION DURING DIAMOND SYNTHESIS

[76] Inventor: Chien-Min Sung, No. 4, Lane 2, Chung-Cheng Rd., Tansui, Taipei County, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/185,930

[22] Filed: Nov. 4, 1998

Related U.S. Application Data

[62] Division of application No. 08/832,852, Apr. 4, 1997, abandoned.

[51] Int. Cl.$^7$ ............................ C30B 19/02; C30B 29/04
[52] U.S. Cl. ................................ 117/79; 117/929
[58] Field of Search ............................ 117/4, 7, 9, 79, 117/929; 423/446; 76/DIG. 12

[56] References Cited

U.S. PATENT DOCUMENTS

| | | | |
|---|---|---|---|
| Re. 32,380 | 3/1987 | Wentorf, Jr. et al. | 407/119 |
| 187,593 | 2/1877 | Brown et al. | 451/544 X |
| 1,988,065 | 1/1935 | Wooddell | 451/529 X |
| 2,078,354 | 4/1937 | Webster | 451/544 |
| 2,268,663 | 1/1942 | Kuzmick | 451/546 |
| 2,725,693 | 12/1955 | Smith | 451/527 |
| 2,952,951 | 9/1960 | Simpson | 451/529 |
| 3,067,551 | 12/1962 | Maginnis | 451/544 X |
| 3,121,981 | 2/1964 | Hurst | 451/544 |
| 3,146,560 | 9/1964 | Hurst | 451/527 |
| 3,802,130 | 4/1974 | Lindenback | 451/544 |
| 3,982,358 | 9/1976 | Fukuda | 451/544 |
| 4,078,906 | 3/1978 | Green | 51/295 |
| 4,341,532 | 7/1982 | Oide | 451/544 X |
| 4,355,489 | 10/1982 | Heyer et al. | 451/532 |
| 4,505,746 | 3/1985 | Nakai et al. | 75/243 |
| 4,547,257 | 10/1985 | Iizuka et al. | 117/79 |
| 4,565,034 | 1/1986 | Sekiya | 451/544 X |
| 4,610,699 | 9/1986 | Yazu et al. | 51/309 |
| 4,712,552 | 12/1987 | Pangburn | 128/355 |
| 4,784,023 | 11/1988 | Dennis | 76/108.2 |
| 4,866,888 | 9/1989 | Murai et al. | 51/401 |
| 4,883,500 | 11/1989 | Deakins et al. | 51/98 |
| 5,030,250 | 7/1991 | Burnand et al. | 51/293 |
| 5,087,435 | 2/1992 | Potter et al. | 423/446 |
| 5,092,082 | 3/1992 | Padberg et al. | 451/548 |
| 5,176,155 | 1/1993 | Rudolph, Jr. | 132/76.4 |
| 5,250,084 | 10/1993 | Lansell et al. | 51/293 |
| 5,443,032 | 8/1995 | Vichr et al. | 117/84 |

FOREIGN PATENT DOCUMENTS

| | | |
|---|---|---|
| 268888 | 6/1989 | Germany. |
| 2008258 | 2/1994 | Russian Federation. |
| 9305004 | 4/1994 | South Africa. |

OTHER PUBLICATIONS

High Temperatures–High Pressures, 1995/1996, vols. 27/28, pp. 523–546 "Mechanism of the Solvent–Assisted Graphite to Diamond Transition Under High Pressure: Implications for the Selection of Catalysts".

*Primary Examiner*—Benjamin L. Utech
*Assistant Examiner*—Donald L. Champagne
*Attorney, Agent, or Firm*—Thorpe North & Western LLP

[57] ABSTRACT

The present invention describes a novel abrasive tool that contains abrasive particles distributed in a predetermined pattern. Such a pattern is produced by fabricating two-dimensional slices and subsequently assembling and consolidating them into a three-dimensional tool. Abrasive particles 20 may be incorporated during the process of making these two-dimensional slices, or they may be planted afterwards into these slices 100 that contains matrix powder. In the latter case, the planting may be guided by a template 110 with apertures 114 laid in a specific pattern.

5 Claims, 4 Drawing Sheets

PROCESS FOR CONTROLLING DIAMOND NUCLEATION DURING DIAMOND SYNTHESIS

This application is a divisional of application Ser. No. 08/832,852 filed Apr. 4, 1997, and abandoned Apr. 7, 2000, which is expressly incorporated herein.

TO THE COMMISSIONER OF PATENTS AND TRADEMARKS

Your petitioner, Chien-Min Sung, a citizen of the United States and resident of Tansui, Taipei County, Taiwan, whose post office address is No. 4, Lane 32, Chung-Cheng rd., Tansui, Taipei County, Taiwan, R.O.C., prays that letters patent may be granted to him as inventor of the improvement in ABBRASIVE TOOLS WITH PATTERNED GRIT DISTRIBUTION AND METHOD OF MANUFACTURE as set forth in the following specification.

BACKGROUND OF THE INVENTION

1. Field of the Invention

The present invention relates to improved abrasive tools used for cutting, grinding and the like. More particularly, the present invention relates to improved abrasive tools wherein abrasive particles are distributed in a predetermined pattern in a matrix powder in order to decrease cost and/or increase the useful life of the tool.

2. State of the Art

Abrasive tools have long been used in numerous applications, including cutting, drilling, sawing, grinding, lapping and polishing materials. Because diamond is the hardest abrasive material and cubic boron nitride is the second hardest, the two materials have been widely used as superabrasives on saws, drills, and other tools which utilize the abrasive to cut, form or polish other hard materials. In 1996, the total value of superabrasive tools consumed was over 5 billion dollars (U.S.). It has been estimated that more than half of the superabrasive tools were consumed in sawing applications such as cutting stones, concretes, asphalts, etc.

Superabrasive tools are particularly indispensable for applications where other tools lack the strength and durability to be practical substitutes. For example, in the stone industry where rocks are cut, drilled, or sawed, diamond tools are the type which are sufficiently hard and durable to make the cutting, etc., economical. If superabrasives were not used, many such industries would be economically infeasible. Likewise, in the precision grinding industry, superabrasive tools, due to their superior wear resistance, are uniquely capable of developing the tight tolerances required, while simultaneously withstanding wear sufficiently to be practical.

Despite the tremendous improvements which diamond and cubic boron nitride have provided for cutting, drilling and grinding tools, there are still several disadvantages which, if overcome, would greatly improve performance of the tools, and/or reduce their cost. For example, the abrasive diamond or cubic boron nitride particles are not distributed uniformly in the matrix that holds them in place. As a result, the abrasive particles are not positioned to maximize efficiency for cutting, drilling, etc., and for production costs of the tools. In some instances, the abrasive particles are disposed too close together. In other instances, the abrasive particles are disposed to far apart from one another.

In all applications, the separation between abrasive particles determines the work load each particle will perform. Improper spacing of the abrasive particles typically leads to premature failure of the abrasive surface or structure. Thus, if the abrasive particles are too close to one another, some of the particles are redundant. The particles are present, but provide little or no assistance in the cutting, grinding, etc., application. Of course, excess particles add to the expense of the abrasive, due the high cost of diamond and boron nitride. Moreover, these non-performing particles can block the passage of debris, thereby reducing the cutting efficiency. Thus, having abrasive particles disposed too close to one another adds to the cost, while decreasing the useful life of the tool.

On the other hand, if abrasive particles are separated too far, the work load (e.g., the impact force exerted by the work piece) for each particle becomes excessive. The sparsely distributed particles may be crushed, or even dislodged from the matrix into which they are disposed. The damaged or missing abrasive particles are unable to fully assist in the work load. Thus, the work load is transferred to the surviving abrasive particles. The failure of each abrasive particle causes a chain reaction which soon renders the tool ineffective to cut, drill, grind, etc.

A typical superabrasive tool, such as a diamond saw blade, is manufactured by mixing diamond particles (e.g., 40/50 U.S. mesh saw grit) with a suitable matrix (bond) powder (e.g., cobalt powder of 1.5 micrometer in size). The mixture is then compressed in a mold to form the right shape (e.g., a saw segment). The "green" form is then consolidated by sintering at a temperature between 700–1200° C. to form a single body with a plurality of abrasive particles disposed therein. Finally, the consolidated body is attached (e.g., by brazing) to a tool body; such a round blade of a saw, to form the final product.

Different applications, however, require different combinations of diamond (or cubic boron nitride) and matrix powder. For example, for drilling and sawing applications, a large sized (20 to 60 U.S. mesh) diamond grit is mixed with a metal powder. The metal powder is typically selected from cobalt, nickel, iron, copper, bronze, alloys thereof, and/or mixtures thereof. For grinding applications, a small sized (60/400 U.S. mesh) diamond grit (or cubic boron nitride) is mixed with either metal (typically bronze), ceramic/glass (typically a mixture of oxides of sodium, potassium, silicon, and aluminum) or resin (typically phenolic).

Because diamond or cubic boron nitride is much larger than the matrix powder (300 times in the above example for making saw segments), and it is much lighter than the latter (about ⅓ in density for making saw segments), it is very difficult to mix the two to achieve uniformity. Moreover, even when the mixing is thorough, diamond can still segregate from metal in the subsequent treatments such as pouring the mixture into a mold, or when the mixture is subjected to vibrations. This diamond distribution problem is particularly troublesome for metal matrix tools. Metal matrix tools may account for more than 60% of the total value of all diamond tools. Within metal matrix tools, diamond saws (circular saws, straight blades, wire saws, etc.) comprise about 80% of the value. Thus, finding a method for increasing life of the abrasive material, and/or decreasing the amount of abrasive which is needed is highly desirable. Such has been accomplished by the invention set forth herein. The invention is applicable to all superabrasive tools, and is particularly effective for diamond saws, the largest value category of all diamond tools.

Over the decades, there have been numerous attempts to solve the diamond distribution problem. Unfortunately, none of the attempted methods have proven effective and, as of today, the distribution of diamond particles in diamond tools is still random and irregular, except for some special cases such as drillers or dressers, where large diamond particles are individually set by hand in the surface to provide a single layer.

One method used in an attempt to make the diamond distribution uniform is to wrap diamond particles with a thick coating of matrix powder. The concentration of diamond particles in each diamond tool is tailored for a particular application. The concentration determines the average distance between diamond particles. For example, the concentration of a typical saw segment is 25 (100 means 25% by volume) or 6.25% by volume. Such a concentration makes the average diamond to diamond distance 2.5 times of the particle size. Thus, if one coats the diamond to 0.75 times of its diameter and mix the coated particle together, the distribution of diamond would be controlled by the thickness of coating and may become uniform. Additional metal powder may be added as interstitial filler between these coated particles to increase the packing efficiency so the consolidation of the matrix powder in subsequent sintering would be easier.

Although the above described coating method has certain merit, in practice, the uniformity of coating is very difficult to achieve. There are many chemical methods to coat diamond grit and its aggregates (polycrystalline diamond). For example, Chen and Sung (U.S. Pat. Nos. 5,024,680 or 5,062,865) described a CVD method for coating diamond grit using a fluidized bed. Sung et al (U.S. Pat. Nos. 4,943,488 or 5,116,568) described another CVD method for coating polycrystalline diamond by fluidized bed. However, most of these methods can only produce thin coatings (e.g. a few micrometers) that do not affect the diamond distribution. Moreover, chemical coating methods typically require treatment at high temperatures (e.g. greater than 900° C.) that may cause damage to diamond. It is well known that synthetic diamond grit tends to form microcracks above this temperature. These microcracks are formed by the back-conversion of diamond to graphite at high temperature. The back-conversion is induced by the catalytic action of metal inclusions that diamond incorporated during its synthesis. CVD treatments cannot readily make thick coatings, and those which are formulated are often cost prohibitive. Thus, CVD treatments are not practical methods to make diamond distribution uniform in the tool.

There are, however, less expensive mechanical methods (e.g., by tumbling diamond particles with metal powder) that can build up a thick coating on diamond grit, typically at a low temperature that would not cause the degradation of diamond. However, it is very difficult to achieve a thick coating with uniform thickness using such methods.

For example, in attempts to practice the invention described in U.S. Pat. No. 4,770,907 and performing "Metal Coating of Saw Diamond Grit by Fluidized Bed" (see p 267–273 of Fabrication and Characterization of Advanced Materials, edited by S. W. Kim and S. J. Park of The Materials Research Society of Korea 1995), the thickness of coated diamond particles varied considerably. Moreover, only extremely fine (i.e. less than 5 micrometers) metal powders can be coated on diamond effectively. Furthermore, the reproducibility of this method is poor. Hence, although such coating may improve the diamond distribution in the tool, its effect is limited.

Furthermore, in mechanical coating, metal powder is held loosely by an organic binder (e.g., PVA, PEG). The coating may be easily rubbed off during the subsequent mixing process, and thereby losing its intended benefit. Although heat treatment may increase the mechanical strength of the coating, nonetheless, it is an additional step with cost.

There is yet another limitation associated with the current methods of coating a tool with diamond particles. Many times a diamond tool requires different sizes of diamond grit and/or different diamond concentrations to be disposed at different parts of the same diamond tool. For example, saw segments tend to wear faster on the edge or front than the middle. Therefore, higher concentrations and smaller diamond grit are preferred in these locations to prevent uneven wear, and thus premature failure of the saw segment. These higher concentration/smaller size segments (known as "sandwich" segments) are difficult to fabricate by mixing coated diamond with metal powder to achieve a controlled distribution of the abrasive particles in the segment. Thus, despite the known advantages of having varied diamond grit sizes and concentration levels, such configurations are seldom used because of the lack of a practical method.

In summary, current arts are incapable of efficiently controlling the uniformity of diamond distribution in the tool. Likewise, the current methods are inadequate to provide effective control of size variations and/or concentration variations on different parts of the same tool. Moreover, even when the distribution is made relatively uniform, current arts cannot tailor the pattern of the distribution to overcome or compensate for typical wear patterns for the abrasive material, when used for a particular purpose. By resolving these problems, the performance of a diamond and other superabrasive tools can be effectively optimized.

It is estimated that less than 10% of abrasives are consumed at work. Most of remainder is wasted due to the low efficiency of using these tools. Among the various causes of this low efficiency, the inability to place every abrasive at the desired location is a major factor. This invention is aimed to make a revolutionary improvement to overcome the deficiency by eliminating random distribution of abrasive particles. The result would be an abrasive tool with every abrasive particle positively planted at desired positions to achieve the maximum utility. Hence, the performance of the abrasive tool can be optimized.

By making the distribution of abrasive particles uniform or tailored to the particular applications of the tool, then the work load can be evenly distributed to each particle. As a result, the abrasive tool will cut faster and its working life be extended a considerable amount of time. Moreover, by eliminating the redundancy, less abrasive may be needed, thereby reducing the cost of the tool manufacture. Additionally, if the distribution can be controlled, abrasive tools utilizing diamond or cubic boron nitride can be configured to provide the most efficient tool profile possible.

The present invention resolves these problems and provides the advantages set forth above by providing a method for forming such tools wherein the abrasive particle distribution can be controlled to provide either uniform grit placement, or to provide grit placement which is tailored to the particular wear characteristics of the tool. Because the distribution of the diamond particles is controlled, the particles can be disposed in patterns which provide for relatively even wear of the abrasive surface, rather than having portions of the surface wear prematurely. As each particle is more fully utilized, there is no need for redundant particles as a back up. Therefore, the cost of making the abrasive tools can be reduced by reducing the overall amount of superabrasive which is used. For example, the cost of superabrasives (diamond or cubic boron nitride) is so high that it often accounts for about half of the total manufacturing cost of the tool. By maintaining the performance of a superabrasive tool with a substantially lower concentration used in a controlled distribution, significant cost saving may be realized due to the decreased need for the expensive abrasive.

SUMMARY OF THE INVENTION

It is an object of the present invention to provide a method for forming superabrasive tools, wherein the distribution of the superabrasive bit is controlled to provide improved cutting, grinding, etc., characteristics without requiring an increase in the amount of superabrasive grit used to form the tool.

It is another object of the invention to provide such a method wherein the distribution of the superabrasive grit is controlled to promote more even wear of the abrasive surface, and thereby lengthen the useful life of the tool.

It is yet another object of the present invention to provide tools with minimal amount of superabrasive required to perform the task for which the tool is designed, thereby reducing the cost of making the tool.

The above and other objects of the invention are achieved by the use of a novel method of forming the superabrasive surface. While the distribution of the diamond or cubic boron nitride particles has always been viewed as a complex, three dimensional problem, the present invention reduces the distribution of the superabrasive to a substantially two-dimensional process that is easy to manipulate and control, and which can be repeated with a high degree of accuracy. More specifically, the desired distribution of abrasive particles in a matrix body is achieved by assembling layers of matrix material that contain a controlled, preset pattern of abrasive particles. Each layer is formed by distributing the superabrasive grit into a layer of bonding matrix in a predetermined pattern. Each layer which is assembled to form a superabrasive impregnated segment can be of the same distribution pattern and concentration, or the distribution pattern and/or concentration may vary from layer to layer.

In accordance with one aspect of the present invention, each layer is assembled by disposing a layer of matrix material so that it may be used as a precursor. The superabrasive grit is then disposed in the matrix material in a desire pattern. After the diamond particles are planted into the matrix material layer in a predetermined pattern, the process is repeated until a desired number of layers have been formed. These layers are then assembled to form the desired three-dimensional body. Subsequently, the diamond tool is consolidated (e.g., by sintering or infiltration as described above) to form the final product.

By reducing the three-dimensional problem to a two-dimensional solution through the use of the layers, the present invention can not only achieve the desirable diamond distribution pattern in the tool body, but can also provide the flexibility for possible manipulation of diamond concentration at different parts of the same tool body. Thus, for example, diamond particles can be disposed in denser concentrations in some layers than others, and the layers with the greater diamond concentrations can be disposed within the three-dimensional structure created in such a manner to prevent the uneven wear patterns that are typical in many prior art abrasive tools.

In accordance with another aspect of the present invention, each superabrasive layer is created by first forming a thin layer of bonding matrix. A template is then disposed on the bonding matrix. The template has a plurality of apertures formed therein which are sized to receive superabrasive grit of a particular size, with one particle being disposed in each aperture. As the superabrasive grit fills the apertures, it may subjected to pressure or otherwised moved into the bonding matrix. Because of the template, the superabrasive with enters the bonding matrix is disposed in a predetermined pattern. A plurality of such superabrasive layers can then be bonded together and attached to the tool by brazing, or some other process, to provide a three-dimensional superabrasive cutting or grinding member on the tool.

In accordance with another aspect of the present invention, the pattern in which the superabrasive grit is disposed may be uniform, or may be calculated to provide superabrasive members which particular cutting abilities. For example, the superabrasive particles may be disposed in varied concentrations to compensate for uneven wear patterns. Thus, the diamond distribution for the cutting edge of a saw may have a greater distribution of diamond particles on the lead edge and sides than on the middle portion which is generally subjected to less wear. Likewise, the sizes of the superabrasive particles can be controlled to provide a cutting, grinding, etc., surface which is tailored to the particular uses and wear patterns for the tool.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1A:
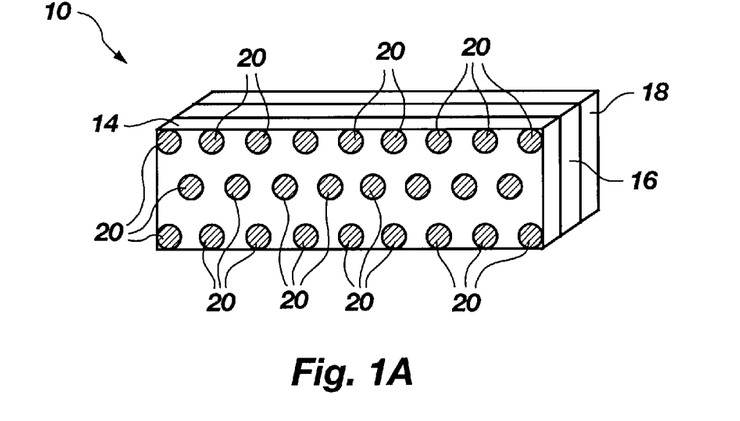
FIG. 1A shows a segment from a superabrasive tool formed by a plurality of linear, longitudinal layers disposed adjacent one another to form a three-dimensional superabrasive member.

Referring to FIG. 1A, there is shown a perspective view of a segment, generally indicated at 10, from a superabrasive tool (the remainder of which is not shown). The segment 10 is formed by a plurality of layers, 14, 16 and 18, which are impregnated with superabrasive particles, indicated by the dark circles 20. The plurality of layers 14, 16 and 18 are disposed adjacent to one another in a linear, longitudinal array so that the layers form the three-dimensional superabrasive segment 10.

As will be discussed in additional detail below, forming the segment 10 in a plurality of thin layers provides remarkably improved control over the distribution of the superabrasive particles. By controlling the distribution of the superabrasive particles within each layer and then combining layers, a three-dimensional segment can be formed in which distribution of the superabrasive particles is controlled in each dimension. This, in turn, enables the formation of segments which are particularly adapted to the likely use of the segment, be it for cutting, sawing, grinding, etc. By tailoring the distribution and concentration of the superabrasive particles within the segment 10, more precise control is given over performance of the tool under actual working conditions.

For example, when using a diamond saw blade to cut a rock (e.g., granite), the two sides of diamond saw segments are cutting more materials than the center. As a result of the uneven wear, the cross section of the saw segment becomes convex in shape with the center bulging above both sides. This configuration typically slows the cutting rate of the saw blade. Moreover, the protruding profile may also cause the saw blade to deflect sideways in the cut slot. In order to maintain a straight cutting path, it is sometimes desirable to make a "sandwiched diamond segment" to reinforce both sides of the segment with layers impregnated with more superabrasive particles. Such a "sandwich segment" is difficult to manufacture by mixing diamond grit with metal powder by conventional means, but it can be easily accomplished by first planting diamond particles with desirable patterns in layered metal matrix and then assembling these layers together to form the sandwich segment.

Figure 1B:
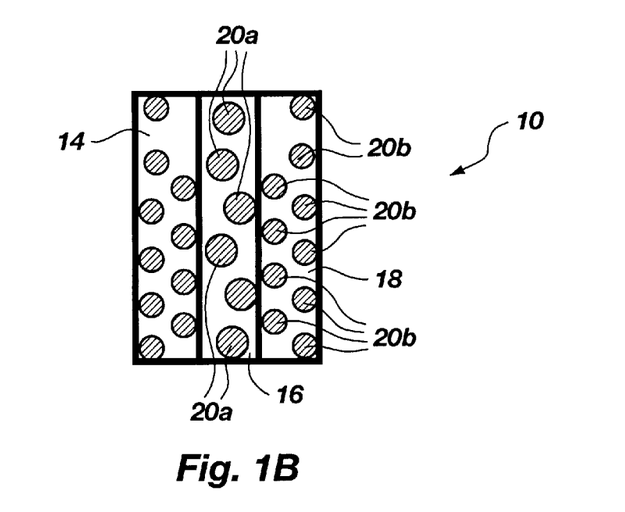
FIG. 1B shows a cross-sectional view of one likely configuration of the tool segment shown in FIG. 1A, wherein a layer formed by a matrix material and a relatively large superabrasive is sandwiched between two layers of matrix materials which have smaller grit and higher concentration of the abrasive.

In accordance with the present invention, a cutting segment can be formed to resist premature wear to the sides of the segment, thereby extending the cutting segment's useful life. Referring specifically to FIG. 1B, there is shown a cross-sectional view of the cutting segment 10 of FIG. 1A. Unlike the cutting segments of the prior art, the cutting segment 10 is formed of three layers, 14, 16 and 18 respectively. The middle layer 16 has a plurality of superabrasive particles 20a which are of a first size (typically 40/50 U.S. mesh) and a first concentration (e.g. 20). The outer layers 14 and 18, in contrast, have a plurality of superabrasive particles 20b, which are of a second size (typically 50/60) smaller than the first size, and in a second concentration greater than that present in the middle layer 16 (e.g. 23). The smaller, more densely distributed superabrasive particles 20b provide the outer layers 14 and 18 with a greater resistance to wear as they cut through concrete, rock, asphalt, etc. Because the outer layers 14 and 18 are more resistant to wear, the cutting segment 10 resists formation of a convex outer surface, as has traditionally occurred with conventional tools. By maintaining a more planar cutting surface or even a concave profile, the cutting segment can maintain a straighter cutting path with a longer useful life. Moreover, by using a smaller grit on the flank of the saw, the finish of cut surface is more smooth. Furthermore, the chipping of the workpiece can be avoided.

Figure 2A:
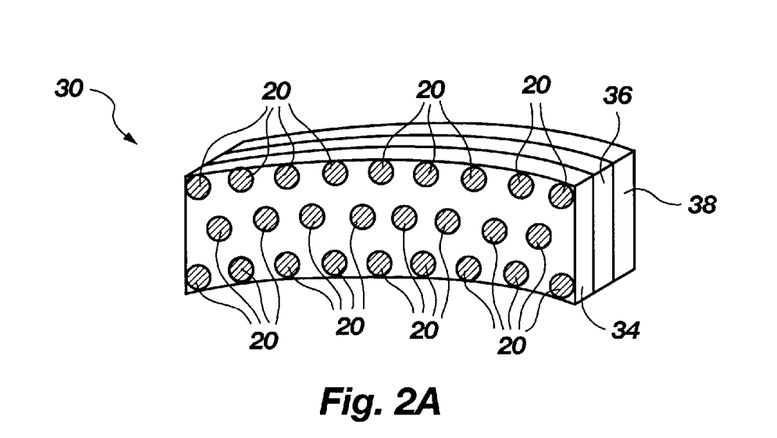
FIG. 2A shows a segment from a superabrasive tool formed by a plurality of arcuate, longitudinal layers which are attached to one another to form a three-dimensional superabrasive member.

Another advantage to the use of multiple layers of matrix with diamond or cubic boron nitride disposed therein is that the layers are easily formed into other desirable shapes for cutting, drilling, grinding, etc. For example, FIG. 2A shows a perspective view of a saw segment, generally indicate at 30, of a superabrasive tool formed by a plurality of arcuate, longitudinal layers which are attached to one another to form a three-dimensional tool member. In this example, the segment 30 is formed from first, second and third layers, 34, 36 and 38, which are each arcuate. When the three are joined together, an arcuate segment 30 is created. Such a segment, of course, may be used on cutting tools which are non linear, and on other types of tools for which a nonlinear superabrasive segment is desired. Because the layers 34, 36 and 38 are initially formed independent of one another, they are much easier to conform to a desired shape, and are able to do so while the superabrasive particles 20 disposed therein are held in their predetermined positions.

Each of the layers is impregnated with a plurality of superabrasive particles 20, typically diamond or cubic boron nitride. Because each layer is formed as a substantially two-dimensional unit (i.e., the matrix will usually be no more than two times the thickness of the diameter of the particles) superior control is provided over placement of the superabrasive particles. As discussed above, the random placement of the prior art often led to ineffective use of superabrasive particles. However, the controlled distribution of the present invention enables either even distribution designed to prevent under or over spacing, or controlled distribution so that different portions of the segment have different sizes and concentrations which are matched to prevent traditional wear patterns.

Figure 2B:
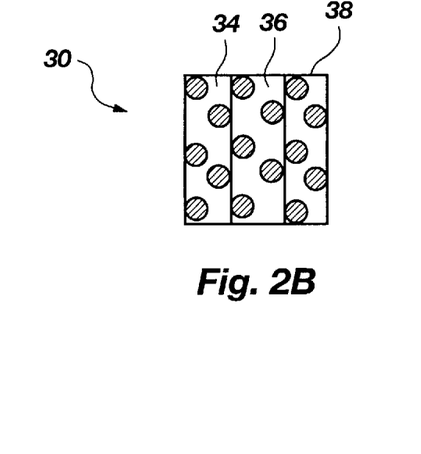
FIG. 2B shows a cross-sectional view of a plurality of layers matrix material as may be used with the segment shown in FIG. 2A.

Referring now to FIG. 2B, there is shown a cross-sectional view of a plurality of the layers 34, 36 and 38 of the segment 30. Of course, the superabrasive particle as may be used with the segment shown in FIG. 1A or that shown in FIG. 2A. Unlike the embodiment of FIG. 1B, the layers are each provided with the same size and concentration of the superabrasive particles 20. However, because the spacing is substantially uniform, there is no underspacing or overspacing between the superabrasive particles, and the segment 30 wears more evenly than the segments of the prior art with randomly spaced particles. The more even wear prevents premature failure of the segment 30, and thus extends the life of the tool while keeping the amount of superabrasive used to a minimum.

Figure 3:
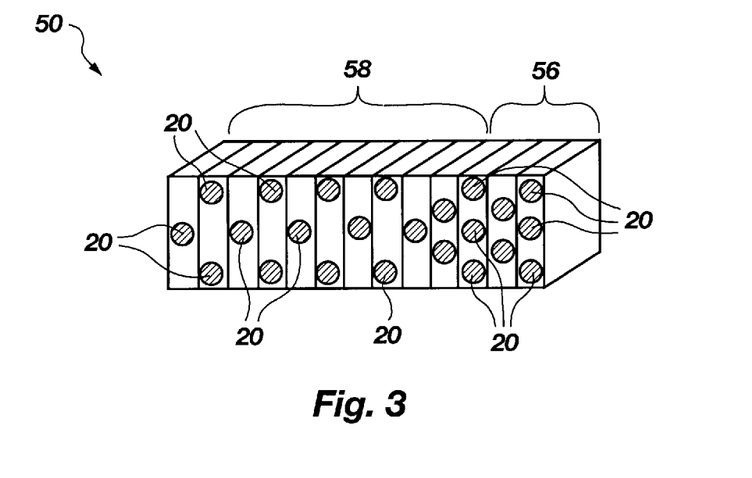
FIG. 3 shows another possible layout of a segment of a cutting tool with transverse layers configured with a denser concentration of abrasive material disposed at a forward, cutting end of the three-dimensional superabrasive member.

FIG. 3 shows another possible embodiment of a segment 50 made in accordance with the teachings of the present invention. The layered structure in a diamond segment may also be assembled transversely or horizontally. Thus, the segment 50 in FIG. 3 is formed from a plurality of transverse layers, generally indicated at 54. A first plurality of layers, indicated at 56 are provided with a first concentration of superabrasive particles 20 (represented by four layers, that contain superabrasive particles 20 distributed with in an offset pattern). A second plurality of layers, indicated at 58, are provided with a second concentration, less than the first concentration (represented by nine layers with an offset pattern of superabrasive particles 20).

Many cutting tools are configured such that the cutting segment So is provided with a lead edge which performs a majority of the cutting and which receives most of the impact force when contacting the workpiece to be cut. For example, a circular saw blade will usually have a plurality of teeth (saw segments), each tooth having a leading edge which takes the force of the cutting. Because the leading edge preforms a significant portion of the cutting, it is much more susceptible to wear than are rotationally trailing portions of the tooth. When formed in accordance with the prior art, the teeth, however, often had similar concentrations of abrasive particles disposed therein. Over time the leading edge wears significantly, but the trailing layers 58 remain with minimal wear. Eventually, the abrasive of the saw tooth is worn off the leading edge, while significant amounts remain on the tail end. Thus, a considerable amount of superabrasive is wasted when the blade is discarded.

The embodiment of FIG. 3 is specifically configured to overcome such concerns. The layers 56 and 58 are configured to provide substantially even wear across the cutting segment 50 by placing a larger percentage of the superabrasive particles 20 near the leading edge, than on rotationally distal portions. Thus, by the time the leading edge has reached the end of its useful life, the remaining portions of the cutting segment 50 have also been worn out. Such controlled distribution of the superabrasive particles 20 decreases the use of the expensive material and lowers the cost for making the cutting segment 50 without hurting performance. Additionally, by providing more even wear, the cutting segment 50 will often be able to maintain most of its cutting speed until shortly before ending its useful life.

Figure 4:
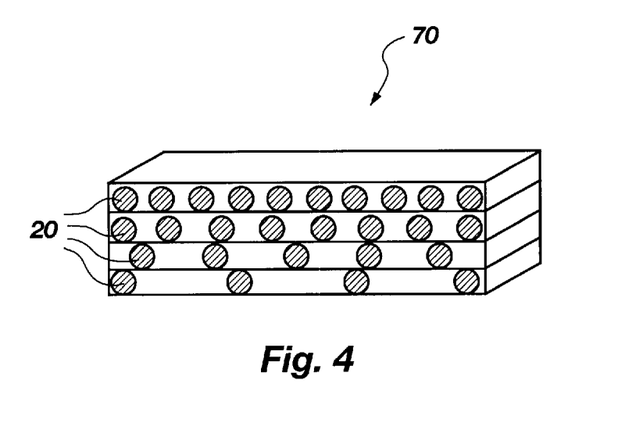
FIG. 4 shows yet another layout of a segment wherein a three-dimensional superabrasive member is formed with progressively denser abrasive distribution toward the upper surface of a tool with horizontal layers.

FIG. 4 shows yet another layout of a segment wherein a three-dimensional superabrasive member is formed with progressively denser abrasive distribution toward the upper surface of a tool with horizontal layers. It is often found that the speed of cutting tends to decrease with the wear of the tool. Thus, with a reduced concentration of superabrasive particles, the tool can maintain its current cutting speed at a constant power of the machine. Thus, as with the embodiment of FIG. 3, the controlled distribution of the superabrasive particles 20 forms an improved abrasive segment 70, while at the same time decreasing the cost of abrasive tools by saving those superabrasive particles which are not needed.

With routine experimentation and the teachings of the method of the present invention, those skilled in the art will be able to customize cutting, drilling, grinding, polishing and other types of abrasive segments which are specifically formed to maximize their performance (i.e. cutting, drilling, grinding, etc.) over an extended useful life, while simultaneously decreasing the amount of expensive superabrasive which is used to form the tool.

Referring now to FIGS. 5A through 5D, there is shown one method for forming layers in accordance with the principles of the present invention. The first step of the method is to form a sheet 100 of matrix material 104 which will be bonded to the superabrasive particles 20. The sheet 100 of matrix material 104 can be formed from conventional metal powders as discussed above, or other bonding agents which have yet to be discovered.

There are many ways that a matrix powder can be made into the sheets 100. For example, the powder can first be mixed with a suitable binder (typically organic) and a solvent that can dissolve the binder. This mixture is then blended to form a slurry with a proper viscosity. In order to prevent the powder from agglomeration during the processing, a suitable wetting agent (e.g., menhaden oil, phosphate ester) may also be added. The slurry can then be poured onto a plastic tape and pulled underneath a blade or leveling device. By adjusting the gap between the blade and the tape, the slurry can be cast into a sheet with the right thickness. The tape casting method is a well known method for making thin sheets out of powdered materials and it works well with the method of the present invention.

Alternatively, the powder can be mixed with a suitable binder and its solvent to form a deformable cake. The cake can then be extruded through a die with a slit opening. The gap in the opening determines the thickness of the extruded plate. Alternatively, the material can also be drawn between two rollers with adjustable gap to form sheets with the right thickness.

It is desirable to make the sheets pliable for subsequent treatments (e.g., bending over a tool substrate which has a curvature). Therefore, a suitable organic plasticier may also be added to provide the desired characteristics.

The use of organic agents for powder (metal, plastics, or ceramics) processing is documented in many text books and it is well known by those skilled in the art. Typical binders include polyvinyl alcohol (PVA), polyvinyl butyral (PVB), polyethylene glycol (PEG), paraffin, phenolic resin, wax emulsions, and acrylic resins. Typical binder solvents include methanol, ethanol, acetone, trichlorethylene, toluene, etc. Typical plasticizers are polyethylene glycol, diethyl oxalate, triethylene glycol dihydroabietate, glycerine, octyl phthalate. The organic agents so introduced are to facilitate the fabrication of metal layers. They must be removed before the consolidation of metal powders. The binder removal process (e.g., by heating in a furnace with atmospheric control) is also well known to those skilled in the art.

Figure 5A:
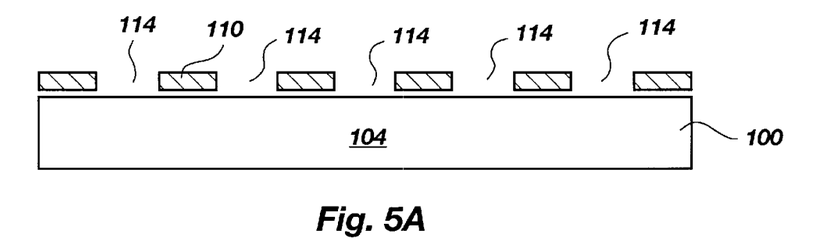
FIGS. 5A through 5D show one possible method for forming layers with controlled superabrasive distribution within the layer.

Once the sheet 100 of matrix material 104 is formed, a template 110 is laid on the top of the sheet. The template 110 contains apertures 114 that are larger than one abrasive particle 20, but smaller than two abrasive particles, thereby allowing a single particle of the abrasive to be disposed at each specific location.

In this example, the thickness of the template is preferably between $1/3$ to $2/3$ of the height of the average abrasive particle 20. However, other thicknesses may be used if appropriate accomodations are made for seating the abrasive particles in the desired locations.

After the template 110 is properly positioned, a layer of abrasive particles 20 is then spread over the template so that each aperture 114 receives an abrasive particle. Those particles not falling into the apertures 114 in the template 110 are removed by tilting the substrate, sweeping the template with a broom, or some other similar method.

Figure 5B:
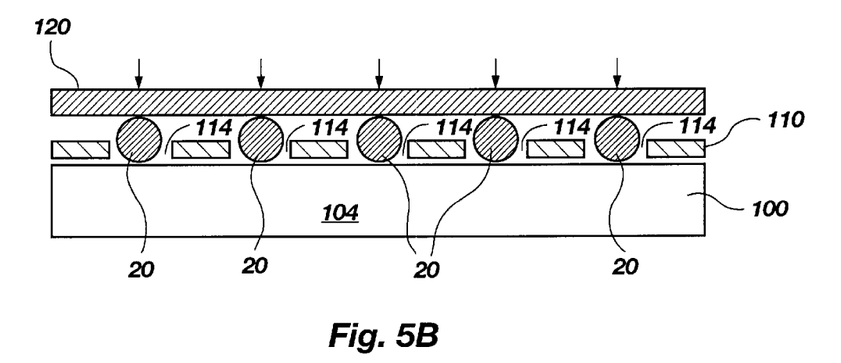

As shown in FIG. 5B, a generally flat surface 120, such as a steel plate) is then laid over the particles 20 which rest in the apertures 114 in the template 110. The flat surface 120 presses the abrasive particles 20 at least partially into the pliable sheet 100 of matrix material 104 to seat the particles.

Figure 5C:
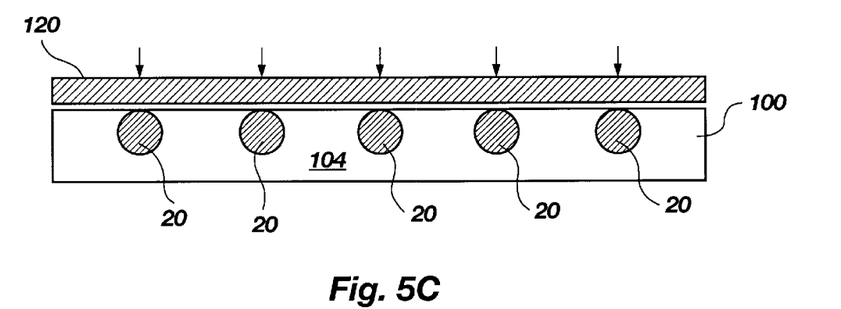

After removing the template 110, the flat surface 120 is used again to press the abrasive particles 120 firmly into the sheet 100 of matrix material 104 as shown in FIG. 5C. While the flat surface 120 is preferable, those skilled in the art will appreciate that there may be occasions when it is desirable to have abrasive particles protruding above the metal sheet 100 with equal height. Alternatively, some of the abrasive particles 20 may be wanted to extend outwardly from the sheet 100 of matrix material more than that of other abrasive particles. In such situations, a contoured or otherwise shaped surface could be used to seat some of the abrasive particles 20 deeper into the sheet 100 of matrix material 104, than other particles.

Figure 5D:
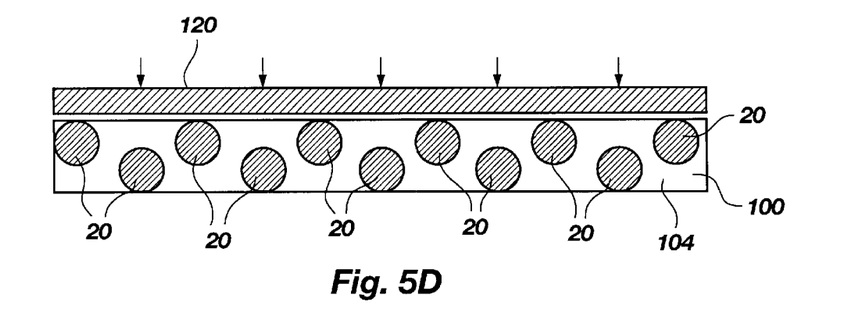

If desired, the process shown in FIGS. 5A through 5C can be repeated on the other side of the sheet 100 of matrix material 104 (as shown in FIG. 5D), to form an impregnated layer having abrasive particles 20 distributed throughout the layer in some predetermined, desired pattern. The process is typically repeated several times to obtain multiple thin layers or sheets 100 which are impregnated with the abrasive particles 20. Of course, each sheet 100 needs not have the same distribution pattern for the abrasive particles 20, nor does it need the concentration of the abrasive particles be the same.

The abrasive impregnated sheets 100 are next cut to any desired size and shape. The sheets 100 are then assembled to form the tool segment or the entire tool body where appropriate. Typically, the assembly of the sheets 100 is accomplished by a known method such as cold compaction with a press. The "green" body so formed can then be consolidated to form a final tool product by conventional method of sintering or infiltration as described by following the examples.

While the method described in FIGS. 5A through 5D is preferred for many applications, there are instances where it is desirable to have the abrasive particles 20 extend outwardly from the sheet 100 of matrix material. For example, some tools may only have one layer of abrasive. This can be accomplished simply by leaving the template 110 in place when performing the steps shown in FIGS. 5A and 5B, and not further pressing the particles 20 into the matrix material once the template has been removed.

Figure 6A:
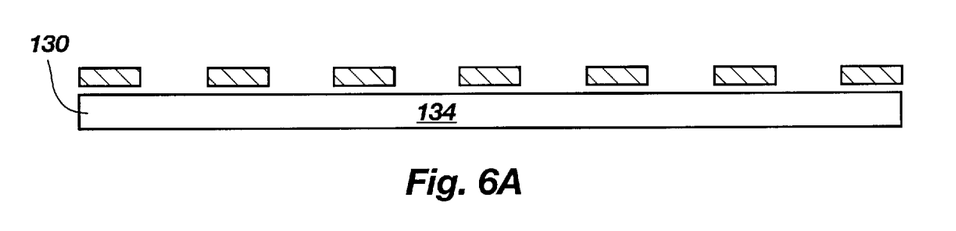
FIGS. 6A through 6C show an alternate method for forming one or more layers with controlled superabrasive distribution.
Figure 6B:
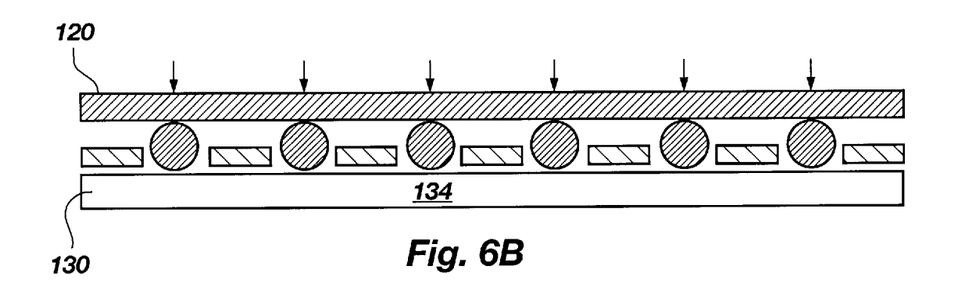
Figure 6C:
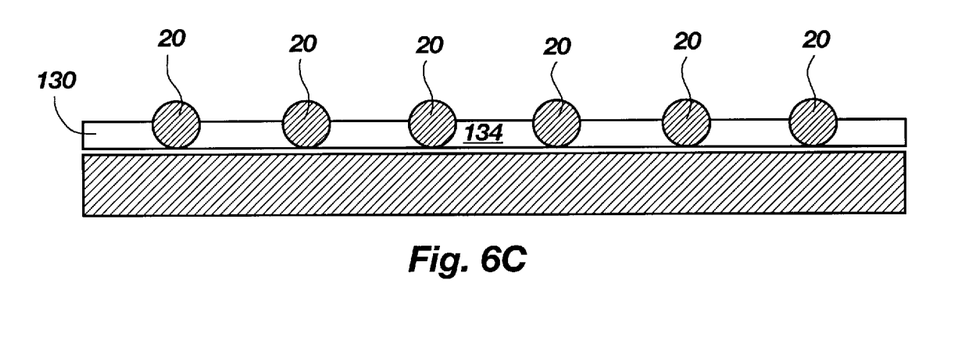

In the alternative, FIGS. 6A through 6C show a side view of an alternate to the method discussed in FIGS. 5A through 5D. The sheet 130 of matrix material in FIGS. 6A through 6C is thinner than the height of the superabrasive particles 20. Thus, in this procedure, when the particles are pressed into the sheet 130, the particles 20 would protrude above the matrix material 134.

Although the present invention is intended for making three-dimensional abrasive tools, the teachings contained in the present application can readily be applied to two-dimensional tools as well. For example, U.S. Pat. Nos. 3,894,673 and 4,108,576 describe certain brazed diamond tools that contain a single layer of diamond particles. These particles are brazed onto a tool shank by a chromium containing alloy. Such diamond tools are widely marketed (e.g., by Abrasives Technology of U.S.A.) for cutting and grinding non-ferrous materials (e.g., stones or glass).

However, the distribution of diamond particles on these tools are typically random and non-uniform. The methods illustrated in FIGS. 5A through 6C can readily be applied to such tools to improve the diamond distribution. In this case, the method offers several advantages over the conventional technology as described by these patents. For example, by making diamond particles distributed in a desirable pattern, the load of cutting can be evenly distributed to all diamond particles. As a result, the tool can cut faster with a longer life. The performance may be further improved by having a braze layer of uniform thickness. This uniformity can allow a better diamond retention and easier debris removal. Moreover, by fully utilizing each diamond particle for cutting, the concentration of diamond can be reduced. As discussed, diamond cost often accounts for about half of the total manufacturing cost of a diamond tool. Hence, by practicing this invention, manufacturing cost can be reduced substantially.

Also shown in FIGS. 6A through 6C is the principle that the spacings of the apertures in the template 130 need not be uniform. Rather, variations in spacing can be provided to facilitate different concentrations on various portions of the sheet 130 of matrix material 134. Likewise, by controlling the size of the apertures 138 and the order in which the diamond particles are placed in the apertures, a single layer could be provided with particles of different sizes.

In addition to being able to improve the performance of the tool and to reduce the cost of the manufacturing, this invention also provides a easier method for making thin bladed tools. For example, the electronic industry requires using larger and larger silicon wafers (now 12 inches in diameter). Hence, thinner saw blades for slicing silicon crystals with lower kurf loss, and thinner dicing wheels for grooving silicon chips with tighter partitions have been in demand.

Prior to the present invention, it has been extremely difficult to make very thin tools that contain evenly distributed diamond particles. The present invention provides an alternative method for making such tools. For example, it has been discovered that by mixing micron powders of diamond, a blend of metal powders (e.g., bronze and cobalt) and a suitable binder, the material can be rolled to a thickness thinner than 0.1 mm—a thickness which is thinner than most dicing wheels. By firing this thin sheet and mounting it on a tool holder, a thin dicing wheel can be made.

In the alternative to the above, it has been found in accordance with the present invention that some of the advantages of the controlled distribution, multilayered superabrasive configurations described above can be achieved without the use of a template. More specifically, the abrasive particles can also be mixed in with the matrix powder and made as an ingredient of the layered sheet. In this case, the distributions of abrasive particles are still somewhat random. Even so, their distribution is typically more uniform than that in a conventional abrasive body. The segregation of abrasive particles and matrix powders discussed in the background section is less extensive in a substantially two-dimensional sheet than in a three-dimensional body. This is particularly true for sheets made by a deforming process (e.g., by rolling). In this case, abrasive particles are further spread out in the matrix by the shearing action of the rollers.

This invention may also be applicable to other applications not related to making abrasive tools. For example, graphite or metal sheets planted with diamond particles may be used as seeds for diamond growth under high pressure and temperature. Industrial diamonds are typically produced by compressing alternative layers of graphite and metal catalyst (e.g., Fe, Co, or Ni alloy) to high pressure and heated above the melting point of the catalyst. Diamond will then nucleate randomly on the interface of these layers. The quality of the diamond crystal formed often suffers by the impingement of growing crystals that are distributed unevenly. Hence, the yield and cost of diamond synthesis can be substantially improved by making the nuclei distributed uniformly. This invention can provide layers of either graphite or metal catalyst with a pre-determined pattern of diamond seeds. If organic binders are introduced during the fabrication of these layers, they can be removed by heating in a furnace before loading into the press.

EXAMPLE 1

40/50 mesh diamond grit (SDA-85 made by De Beers Company) were mixed with metal powder to form a mixture with diamond concentration of 20 (5% of total volume). Five different proportion of cobalt (about 1.5 micrometer in size) and bronze (about 20 micrometers in size) were used for the matrix powder. An acrylic binder was added (8% by weight) to the mixture and the charge was blended to form a cake. The cake was then rolled between two stainless steel rollers to form sheets with a thickness of 1 mm. These sheets were cut in the shape of saw segments with a length of 40 mm and width of 15 mm. Three each of such segments were assembled and placed into a typical graphite mold for making conventional diamond saw segments. The assembled segments were pressed and heated by passing electric current through the graphite mold. After sintering for three minutes, the segments were consolidated to a height of 9 mm with less than 1% porosity. Twenty-four segments for each composition were fabricated. They were brazed onto a circular saw of 14 inches in diameter. These five blades were used for cutting granites and found to perform equal or better than those with higher diamond concentrations (e.g. 23) made by conventional methods. Microscopic examination of the worn segment indicated that although diamond particles were not planted into the layered matrix, there were distributed more evenly than segments prepared by the traditional method. The segregation of particles in layered matrix was considerably less than that in a thick body of conventional segments.

EXAMPLE 2

The same procedures were followed as Example 1, but with 8 thinner layers (0.4 mm) for each segment. The diamond concentration was reduced to 15 and particles were planted according to the illustration as shown in FIGS. 5A through 5D. The diamond distribution was much improved. As a result, the performance of these blades were equal or better than those made by conventional methods with diamond concentration of 20.

EXAMPLE 3

Iron powders of about 100 mesh were mixed with an S-binder made by Wall Colmonoy Company to form a cake. The cake was then rolled to form sheets of 0.4 mm in thickness. 40/50 mesh SDA-100 diamond grit was planted into these sheets to attain a concentration of 15. These diamond containing sheets were cut in the shape of saw segments with a length of 40 mm and width of 9 mm. Eight of such segments were assembled as a group and placed in a graphite mold. Twenty-four groups were placed horizontally, and another twenty-four groups were placed vertically in the graphite mold. Nicrobraz LM powder (−140 mesh) (made by Wall Colmonoy Company) was added on the top of these segments. These samples were heated in a vacuum furnace ($10^{-5}$ torr) to 1050° C. for 20 minutes for horizontally placed segments, and 30 minutes for vertically placed segments. The melted LM alloy (Ni—Cr—B—Si with a liquidus point at 1000° C.) infiltrated into these segments and filled the porosity. The excess LM braze on these segments were ground by electrode discharge (EDG). Each of the 24 segments so fabricated were brazed onto a 14 inch (diameter) circular saw blade. These blades were used to cut granite and showed marked improvement over conventional saw blades.

EXAMPLE 4

Nicrobraz LM powder was mixed with an acrylic binder and rolled to form layers of about 0.25 mm. 40/50 mesh MBS-960 diamond grit manufactured by General Electric Company was planted into these metal layers according to the method as illustrated in FIG. 5. These diamond planted metal layers were cut in proper size and wrapped around 2,000 beads (pearls) of wire saw. These beads (10 mm in diameter by 10 mm long) were divided into two groups, one contains 280 crystals (about 0.2 carat) per bead; and the other, 400 crystals (about 0.3 carat). These beads were heated in a vacuum furnace to a temperature of 1,000° C. for 8 minutes. These beads were mounted on several wire saws and used to cut marble, serpentine and granite. The performance of these beads was found to be superior to conventional beads. The latter beads were typically made by either hot pressing or electroplating. These conventional beads may contain a much higher amount of diamond (up to 1 carat) per bead.

EXAMPLE 5

The same method as described by Example 4, but applied to other products, e.g., circular saws, thin-wall core bits, and curvature grounder. Each of these products shows superior performance over conventional electroplated diamond tools having a similar superabrasive concentrations.

The above description and examples are intended only to illustrate certain potential uses of this invention. It will be readily understood by those persons skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance for scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The forgoing disclosure is not intended to be construed to limit the present invention or otherwise to exclude any such other embodiment, adaptations, variations, modifications and equivalent arrangements, the present invention being limited only by the claims appended hereto and the equivalents thereof.

What is claimed is:

1. A method for controlling nucleation sites during diamond synthesis comprising the steps of:
    a) forming a substrate layer, wherein said substrate layer is a catalyst material, or graphite;
    b) placing a template having a pattern of apertures upon the substrate layer, each of said apertures being configured to receive a single diamond particle;
    c) filling the apertures of said template with diamond particles; and
    d) pressing said diamond particles into the substrate layer.

2. The method according to claim 1, wherein said step a) further comprises the steps of:
    a) providing said catalyst material, or said graphite, in a powdered form;
    b) mixing an organic binder with the powder of the substrate layer;
    c) forming the mixture of organic binder and powder into a desired shape; and
    d) removing the organic binder by heating the substrate layer to a temperature sufficient to remove the binder.

3. The method according to claim 1, wherein said substrate layer is a catalyst layer.

4. The method according to claim 1, wherein said substrate layer is a graphite layer.

5. The method of claim 1, further comprising the step of:
    removing said template from the substrate without disturbing the placement of said diamond particles, wherein said step is performed following step c).

* * * * *